May 21, 1940.  A. M. FERRARI  2,201,766
SAW SHAPER
Filed March 15, 1937  2 Sheets-Sheet 1
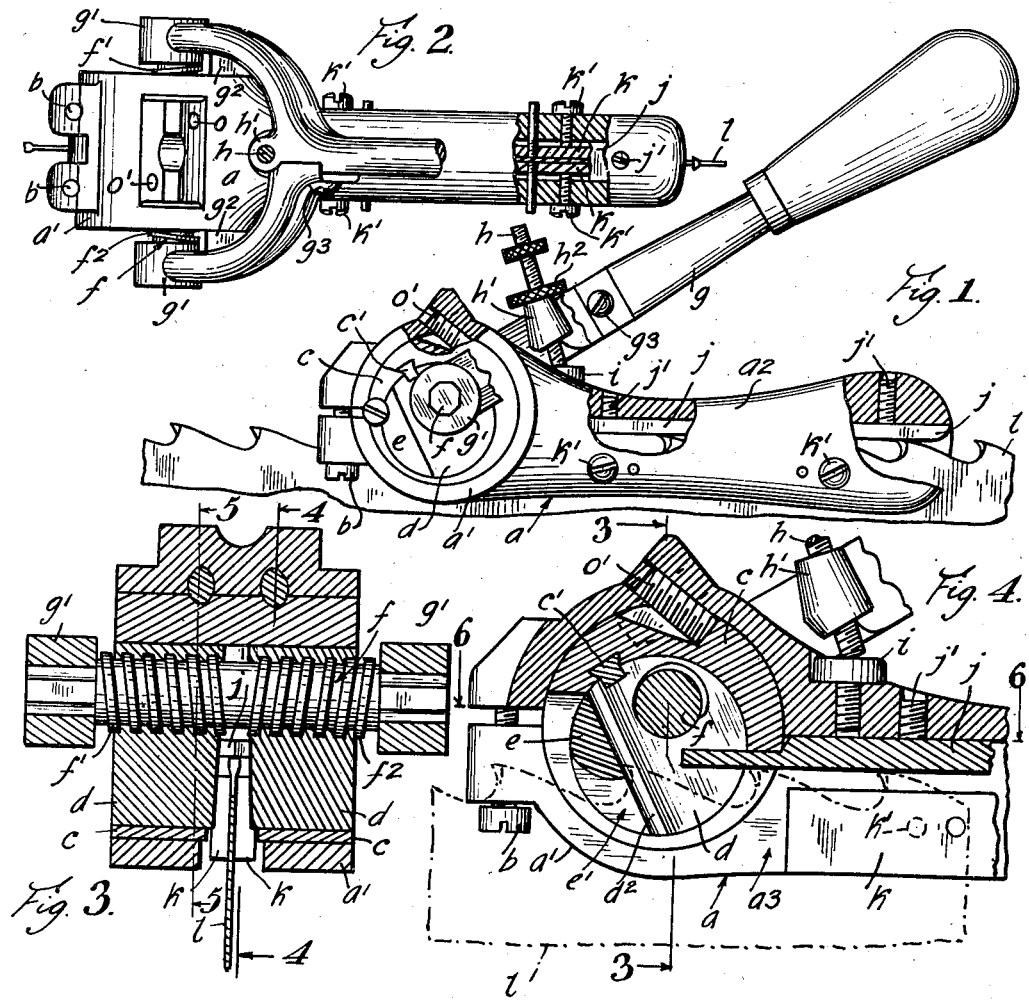
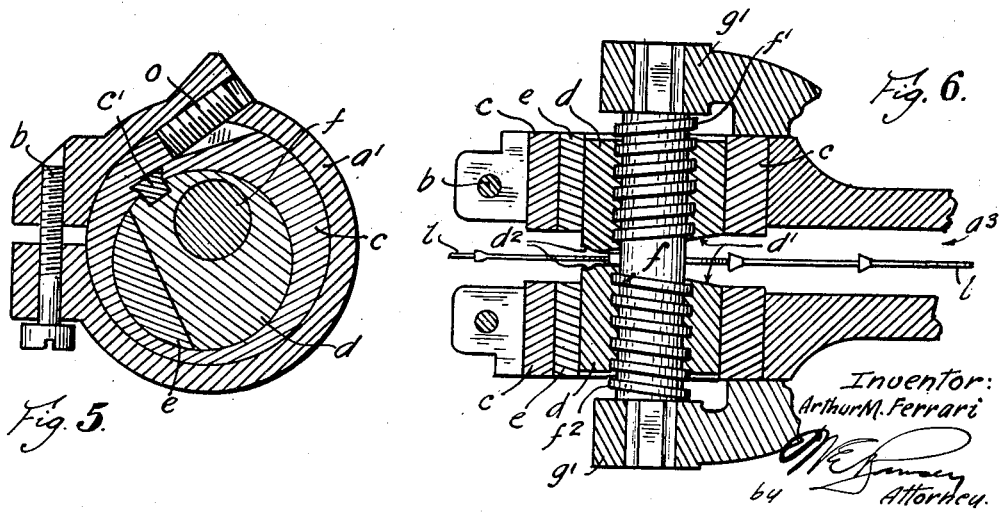
Inventor:
Arthur M. Ferrari
by
Attorney.

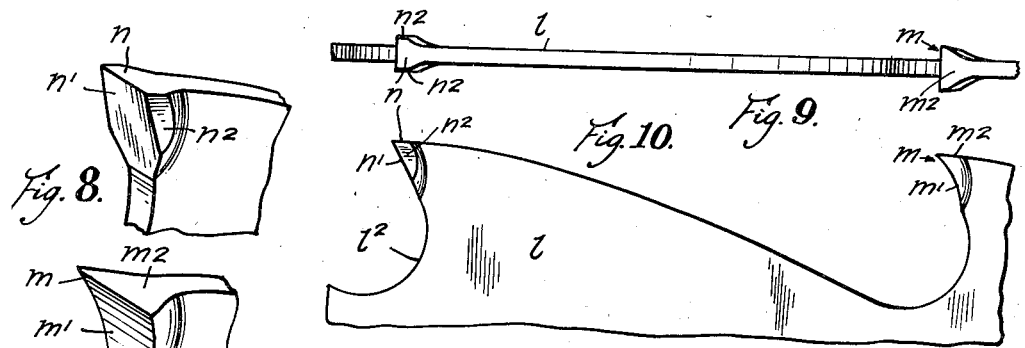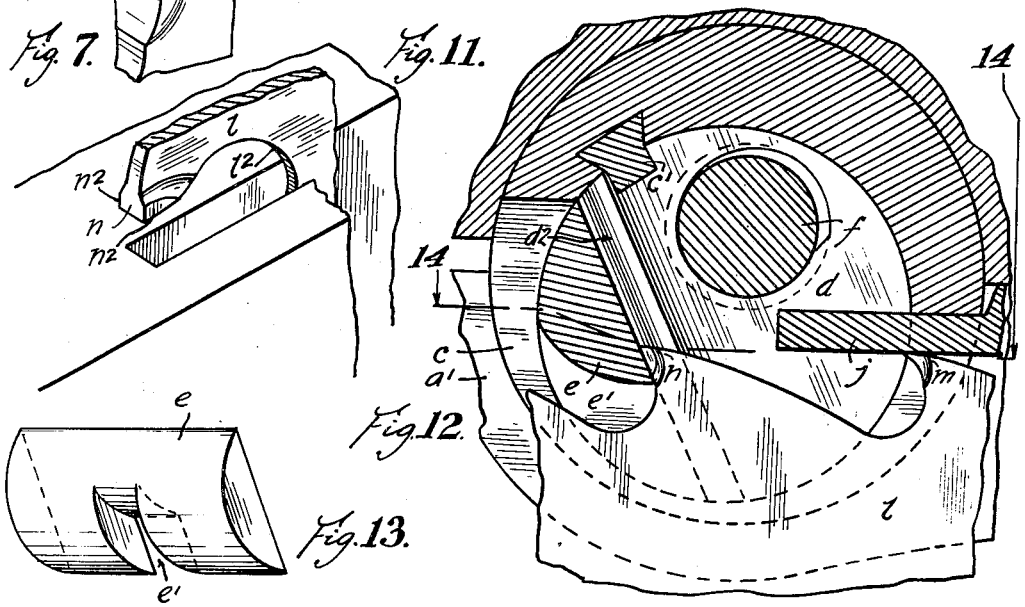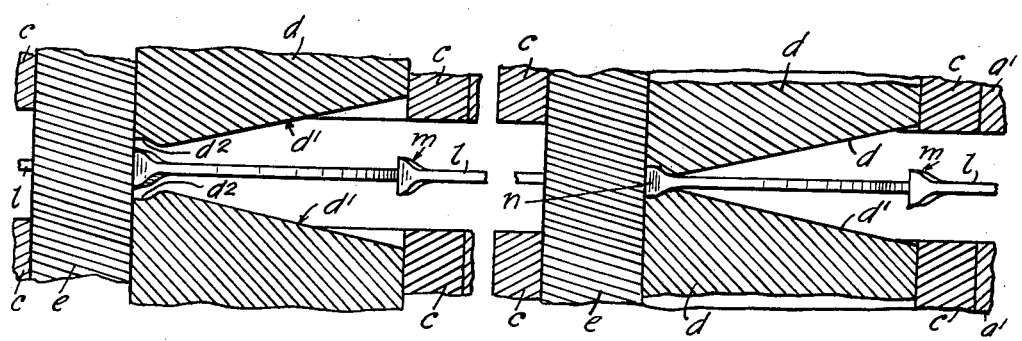

Patented May 21, 1940

2,201,766

UNITED STATES PATENT OFFICE 2,201,766

SAW SHAPER

Arthur M. Ferrari, Klamath Falls, Oreg.

Application March 15, 1937, Serial No. 130,983

17 Claims. (Cl. 76—49)

The object of my invention is to provide a saw tooth shaper which is adapted to form the swaged portion of a saw tooth to proper curvature, to aline them with respect to other teeth and to shape them so that the ideal pattern of the hooked portion of the tooth is disturbed to a minimum and the material is arranged so that a minimum amount will be lost in sharpening and resharpening.

In the preparation of saw teeth, which is generally termed saw filing, a tooth must first be swaged by being upset to such a degree that it is substantially broader than the gage of the saw blade. It is usually swaged an excessive amount and the excess is mashed back by a saw tooth shaper. Swaging is almost universally accomplished by means of a rotatable round die. This distorts the hooked saw tooth pattern to such a degree that the material provided for producing the swage is moved inwardly from the hooked underface or gullet to destroy the sweep of its normal profile. In shaping, said material is not exactly replaced and thus said excess in the main must be dressed off in sharpening and resharpening and is thus lost. This loss in the formation of a tooth causes a corresponding shortening of the life of the saw.

A further object of my invention is to provide a saw tooth shaper designed to produce those teeth illustrated in the co-pending application for patent of myself and George M. Hoffman, Serial No. 57,482, filed in the United States Patent Office January 4, 1936, and entitled Method and means for saw surfacing and cleaning a saw kerf. In teeth of the character illustrated in said application for patent, the extreme point of the saw tooth is of less breadth than the portions of the saw tooth extending into the gullet. The saw tooth is formed with a saw swage having the same general characteristics as others and usually a greater quantity of material is upset to produce said swage. If uniform practice were observed the formation of said teeth would result in excessive wasting away of a saw blade.

The object of my invention with respect to said teeth is to provide a saw tooth shaper which is adapted to form a tooth of this character and to force the material upset in the swaging action back to the general sweep of the gullet and to form the contour of said tooth with minimum waste.

I accomplish these objects in a saw tooth shaper having a pair of compression dies moved towards and from each other by a lead screw having threaded portions of opposite hand but equal pitch so as to move said dies equally in opposite directions upon rotation of said screw. I provide a tooth stop for engaging the under face of the saw so as to span the space between said compression dies, but to die at one side thereof. Said tooth stop and said dies together form a cylindrical body and said tooth stop constitutes an anvil rigidly braced. The faces of the compression dies are inclined to produce a tooth adapted to perform the operation desired and as described in said application for patent in which I am a joint inventor, and the forward edges of said die adjacent said tooth stop are relieved or recessed to approximately the contour of the tooth to be shaped. The parting line between said tooth and the dies is made to follow the general contour of the under face of the hooked tooth. Thus, when said dies are brought together, the excess material is trapped within the relieved portion of the dies and is forced against the face of the anvil. The compression exerted by said dies is sufficient to cause said metal to flow and to be returned to the original general sweep of said under face of the tooth but to be formed in contour to the desired shaped tooth.

The details of my invention are hereinafter described with reference to the accompanying drawings, in which:

Fig. 1 is an elevation of a saw tooth shaper embodying my invention with portions shown broken away to disclose details of construction, said shaper being shown mounted upon a section of a saw blade;

Fig. 2 is a plan view thereof with portions also shown broken away to disclose details of my invention;

Fig. 3 is a transverse section taken on the line 3—3 in Figure 4;

Fig. 4 is a longitudinal section taken on the line 4—4 in Figure 3;

Fig. 5 is a section taken on the line 5—5 in Figure 3;

Fig. 6 is a section taken on the line 6—6 in Figure 4;

Fig. 7 is a fragmentary diagrammatic view of a saw tooth after it is swaged, but before it is shaped;

Fig. 8 is a similar view of a saw tooth after it is shaped by a saw tooth shaper embodying my invention;

Fig. 9 is a plan view of a section of a saw blade showing two teeth, the right hand tooth shown swaged but unshaped, and the left hand tooth shaped by a device embodying my invention;

Fig. 10 is an elevation of said section of saw blade showing the teeth in elevation and similarly disposed and treated;

Fig. 11 is a diagrammatic perspective detail illustrating a section of saw blade, one tooth and a section of board being operated upon;

Fig. 12 is a larger scaled section taken on the same general line as is Figure 4 showing the arrangement of the operating parts with relation to a section of saw blade;

Fig. 13 is a perspective detailed view of the tooth stop of a shaper embodying my invention which constitutes the anvil against which the dies force the material of the swaged portion of the saw tooth when shaping it;

Fig. 14 is a more or less diagrammatic view taken on the line 14—14 in Fig. 12 in which the compression dies are spaced apart and in which an unshaped tooth is resting against the tooth stop; and Fig. 15 is a view similar to Figure 14 in which said dies have closed upon the saw tooth and have formed it to proper contour.

A saw tooth shaper embodying my invention comprises a body $a$ having a tubular head $a'$ on one end and a handle portion $a2$ at the other. Said head is formed into a clamp by means of screws $b$ to encircle and engage an eccentrically bored sleeve $c$. Slidingly mounted in the bore of said sleeve is a pair of compression dies $d$. A key $c'$ extends longitudinally of the bore of said sleeve and slidingly engages the dies so as to prevent said dies from rotating in said bore. Also located in said bore is a tooth stop $e$. The dies are adapted to be spaced apart, as is shown in Figure 3, and the tooth stop extends the full length of the bore and thus spans the space between said dies. Said tooth stop is bifurcated in part, as is shown in Figure 4, a portion $e'$ being cut away so that only the points of saw teeth to be operated upon are engaged thereby. This is shown most clearly in Figure 12.

A lead screw $f$ provided with two opposite hand threads $f'$ and $f2$ engages the dies $d$ respectively. Thus, rotation of said lead screw causes said dies to be moved in equal and opposite directions either towards or from each other. The ends of the lead screw are non-circular and are engaged by the bifurcated ends $g'$ of an operating lever $g$. Thus, the swing of said lever, as illustrated in Figure 1, in a clockwise direction tends to move the dies towards each other and a movement in the opposite direction tends to space said dies apart. Said operating lever is provided with bosses $g2$ on the inner faces of the bifurcated ends $g'$ and said bosses bear against the side faces of the head of the body. This prevents the lead screw from shifting laterally and causes the dies to move equally with relation to the median line of said body. The bifurcated ends preferably are arranged in two pieces and are secured together by a bolt $g3$ to aid in assembly.

An adjustment is provided to determine the end of the operating stroke of the lever $g$. This is accomplished thru a set screw $h$ threaded into a projection $h'$ on said lever. The end of said set screw engages the top of a threaded stop button $i$ carried by said body. A stop button is provided on said body so as to define a plane surface and one which may be substantially harder than the material of which the body is made. It also can be replaced if it becomes worn. The set screw has a lock nut $h2$ so that the said screw can be fixed in any desired position.

I provide a tooth rest bar $j$ in a longitudinal slot $a3$ extending centrally of the handle $a2$ of the body. Said tooth rest bar can be adjusted vertically of said slot by an adjustment of set screws $j'$ arranged in said handle. I provide a pair of guides $k$ in said slots lying laterally of the latter and their relative position in said slots can be adjusted by a pair of opposed set screws $k'$ shown in Figure 2. The position of the tooth rest bar determines the position of the saw tooth shaper upon a saw $l$ to be shaped. This is most clearly illustrated in Figure 4. The under surface of the tooth rest bar rests upon the points of the saw teeth and the guides bear against the faces thereof. This locates a saw tooth to be operated upon correctly with respect to the compression dies and an anvil which constitutes a tooth stop.

Many of the structural features heretofore described are common in saw tooth shapers. The novelty of my saw tooth shaper rests primarily in the arrangement and formation of the operating faces of dies $d$ and their relation to the tooth stop $e$. These features are most clearly shown in Figures 7 to 15 inclusive.

As has been pointed out, the dies $d$ are slabbed off from cylindrical members and together only occupy a portion of the head $a'$ of the shaper body. This defines a space between the opposed operating faces $d'$ of the dies. It is between said operating faces that a saw tooth is to be compressed and shaped. Spanning the space between said faces but lying alongside of the latter is the tooth stop $e$. Said tooth stop in section corresponds exactly to the portion of the dies slabbed off from a true cylindrical member, as is shown most clearly in Figure 5. The center of said tooth stop is cut away as is shown in Figures 4, 12 and 13 and the portion of said tooth stop which engages a saw tooth $n$ engages only the swaged point thereof. The portions of the opposed operating faces $d'$ of the die adjacent said tooth stop are cut away or relieved as at $d2$. Said relieved portion $d2$ conforms substantially to the contour of the tooth to be shaped. This is diagrammatically illustrated in Figures 14 and 15. The tooth to be shaped is shown as it is formed after swaging in Figure 14 and is shown in Figure 15 how it conforms to the relieved portion $d2$ of the opposed operating faces of the die at the end of the operating stroke. A close examination of said swaged portions of the saw tooth before and after the shaping operation will disclose that there is not as much material in said swaged portion after shaping as there is before. Said excess metal must be forced out some place by the operation of said dies.

Reference is had to Figure 7. In said figure, a saw tooth $m$ is illustrated as said tooth looks after swaging, but before shaping. The face $m'$ of said tooth is concave while the back $m2$ is wedge-shaped terminating in relative sharp points at each side of the face. It is common practice to over swage teeth so that an excess amount of material is upset and forced laterally of the tooth to insure sufficient material being present to form a proper cutting point. In shaping, two dies are arranged to force said material back so the teeth will aline but to provide teeth broader than the gage of the blade. No effort has been made, so far as I am familiar, to confine the flow of metal under the action of said compression dies. Said metal is forced inwardly and normally folds. That is, inwardly turned edges are formed leaving the central portion unaffected. The material thus formed into said edges must later be trimmed off and said material is thus wasted.

In my invention said material is forced back by said dies against the relatively heavy anvil which also constitutes a tooth stop. The relieved portions of the dies hold the tooth so that the saw cannot be forced away from the anvil and thus the material under the action of said dies is forced against the anvil and a flat underface is provided, as is illustrated in Figure 8. The tooth end illustrated in said figure has a flat face $n'$ formed by the formation of flat sides $n2$. The back of said saw tooth thus is no longer wedge-shaped but might be said to resemble a spade in contour. That is, behind the face $n'$ is a substantial area of approximately uniform thickness. Said material thus serves to support and back up the material constituting the face $n'$. The face $n'$ is flat and follows generally the general sweep of the gullet $i^2$ of the saw as is illustrated in Figure 10 in the left hand tooth. Before shaping, but after swaging, the gullet is distorted by the concave inner face of the swaged, but unshaped tooth as is illustrated in the right hand tooth. Thus, the relieved or recessed portion of the operating faces of the dies serve to partially encompass the swaged portion of a saw tooth. The tooth is initially arranged against the face of the tooth stop which constitutes an anvil. The continued pressure of said dies moving equally from opposite directions serves to cause the metal of the swaged portion of the saw tooth to flow because it is being moved into smaller compass than it first occupied. The metal is forced to flow towards the anvil to eliminate the cupped face formed by the original swaging action. The metal thus flows to a point where it occupies substantially the same lateral position that it did before swaging except that said saw tooth is broader and the displacement produced by swaging has straightened the entire tooth up slightly but uniformly. A tooth formed in this manner subsequently requires a minimum amount of initial sharpening and said edge holds its sharpness for a longer period of time and there is a greater body of material in the swaged portion to accommodate several resharpenings without requiring reswaging and reshaping each time. In addition, a saw tooth is provided having a transverse profile adapted to perform the operation described in the co-pending application, Serial No. 57,482, previously referred to is provided.

A shaper of this character is not limited to teeth having but one surface profile. The anvil and dies can be adjusted to accommodate most standard teeth profiles. This is accomplished by rotating said die and anvil and their encompassing sleeve in the bore of the body head. This is accomplished by two opposed set screws $o$—$o'$ extending obliquely in opposite direction to the wall of the head $a'$ as is illustrated in Fig. 4. Backing off one of said set screws and threading the opposite one in will produce rotation of said sleeve and therewith the dies and anvil. This will vary the angularity of the plane of separation of the anvil and the die accordingly. Various length teeth can be accommodated by adjustment of the set screws $j'$ for the tooth rest bar and various gage saws can be likewise accommodated by corresponding adjustments of the set screws $k'$ for the guides $k$.

I claim:

1. In a saw tooth shaper, a pair of compression dies, means for moving said dies towards and from each other, a tooth stop comprising an anvil arranged longitudinally alongside said dies and parallel to the paths of movement thereof spanning the distance between them, said dies and said tooth stop adapted to engage the sides and face of the swaged portion of a tooth and together defining a cylindrical body extending transversely of said shaper.

2. In a saw tooth shaper, a pair of compression dies, means for moving said dies towards and from each other, a tooth stop comprising an anvil arranged longitudinally alongside said dies and parallel to the paths of movement thereof spanning the distance between them, said dies and said tooth stop adapted to engage the sides and face of the swaged portion of a tooth and together defining a cylindrical body extending transversely of said shaper, the parting line between the dies and the tooth stop being straight and constituting a chord of the arcuate periphery of said tooth stop.

3. In a saw tooth shaper, a pair of compression dies, means for moving said dies towards and from each other, a tooth stop comprising an anvil arranged longitudinally alongside and facing said dies, spanning the distance between them, said dies and said tooth stop together defining a cylindrical body extending transversely of said shaper, the tooth stop being partially slotted in the plane of the opposed faces of said dies, the parting line between the dies and the tooth stop being straight and constituting a chord of the arcuate periphery of said tooth stop, the opposed die faces arranged adjacent the tooth stop being relieved and with the face of said stop approximating the contour of a saw tooth to be shaped, the opposed faces of said dies lying generally in planes diverging relatively from each other and obliquely to the face of said tooth stop.

4. A saw tooth shaper comprising a longitudinally slotted body provided with a transverse bore, a pair of dies slidably mounted in said bore and held against rotation therein, said dies being arranged at opposite sides of said body slot, means engaging said dies and adapted to move the latter towards and from each other relatively, a tooth stop also arranged transversely of said body bore lying alongside said dies and spanning the distance between them, said tooth stop constituting an anvil and having tight sliding engagement with the sides of said dies.

5. A saw tooth shaper comprising a longitudinally slotted body provided with a transverse bore, a pair of dies slidably mounted in said bore and held against rotation therein, said dies being arranged at opposite sides of said body slot, means engaging said dies and adapted to move the latter towards and from each other relatively, a bored sleeve arranged in the bore of said body and encircling said dies, said sleeve provided with a non-circular portion extending longitudinally of said bore to prevent said dies from rotating therein, but to permit them to have longitudinal movement therein, a tooth stop also arranged transversely of said body bore lying alongside said dies and spanning the distance between them, said tooth stop constituting an anvil and having tight sliding engagement with the sides of said dies.

6. A saw tooth shaper comprising a longitudinally slotted body provided with a transverse bore, a pair of dies slidably mounted in said bore and held against rotation therein, said dies being arranged at opposite sides of said body slot, means engaging said dies and adapted to move the latter towards and from each other relatively, a bored sleeve arranged in the bore of said body and encircling said dies, said sleeve provided with a non-circular portion extending longitudinally of said bore to prevent said dies from rotating therein, but to permit them to have longitudinal movement therein, a tooth stop also arranged transversely of said body bore lying alongside said dies and spanning the distance between them, said tooth stop constituting an anvil and having tight sliding engagement with the sides of said dies, said sleeve being transversely slotted, the sleeve slot being alined with the body slot, a tooth rest bar arranged in said body slot having one end extending thru said sleeve slot, said end extending between the opposed faces of said dies.

7. A saw tooth shaper comprising a longitudinally slotted body provided with a transverse bore, a pair of dies slidably mounted in said bore and held against rotation therein, said dies being arranged at opposite sides of said body slot, a lead screw provided with a pair of opposite hand threads engaging said dies and adapted to move the latter towards and from each other relatively, a lever engaging said lead screw, means for limiting the stroke of said handle, a tooth stop, also arranged transversely of said body bore lying alongside said dies and spanning the distance between them, said tooth stop constituting an anvil and having tight sliding engagement with the sides of said dies.

8. A saw tooth shaper comprising a longitudinally slotted body provided with a transverse bore, a pair of dies slidably mounted in said bore and held against rotation therein, said dies being arranged at opposite sides of said body slot, means engaging said dies and adapted to move the latter towards and from each other relatively, a bored sleeve arranged in the bore of said body and encircling said dies, said sleeve provided with a non-circular portion extending longitudinally of said bore to prevent said dies from rotating therein, but to permit them to have longitudinal movement therein, means adapted to adjust rotatably and fix said sleeve in the body, a tooth stop also arranged transversely of said body bore lying alongside said dies and spanning the distance between them, said tooth stop constituting an anvil and having tight sliding engagement with the sides of said dies.

9. A saw tooth shaper comprising a longitudinally slotted body provided with a transverse bore, a pair of dies slidably mounted in said bore and held against rotation therein, said dies being arranged at opposite sides of said body slot, means engaging said dies and adapted to move the latter towards and from each other relatively, a bored sleeve arranged in the bore of said body and encircling said dies, said sleeve provided with a non-circular portion extending longitudinally of said bore to prevent said dies from rotating therein, but to permit them to have longitudinal movement therein, a pair of opposed adjusting screws adapted to adjust rotatably and fix said sleeve in the body, a tooth stop also arranged transversely of said body bore lying alongside said dies and spanning the distance between them, said tooth stop constituting an anvil and having tight sliding engagement with the sides of said dies.

10. A saw tooth shaper comprising a longitudinally slotted body provided with a transverse bore, a pair of dies slidably mounted in said bore and held against rotation therein, said dies being arranged at opposite sides of said body slot, a lead screw provided with a pair of opposite hand threads engaging said dies and adapted to move the latter towards and from each other relatively, a lever engaging said lead screw, a bored sleeve arranged in the bore of said body and encircling said dies, said sleeve provided with a non-circular portion extending longitudinally of said bore to prevent said dies from rotating therein, but to permit them to have longitudinal movement therein, means adapted to adjust rotatably and fix said sleeve in the body, a tooth stop also arranged transversely of said body bore lying alongside said dies and spanning the distance between them, said tooth stop constituting an anvil and having tight sliding engagement with the sides of said dies.

11. A saw tooth shaper comprising a longitudinally slotted body provided with a transverse bore, a pair of dies slidably mounted in said bore and held against rotation therein, said dies being arranged at opposite sides of said body slot, a lead screw provided with a pair of opposite hand threads engaging said dies and adapted to move the latter towards and from each other relatively, a bifurcated lever engaging both ends of said lead screw and bearing against the sides of said body, a bored sleeve arranged in the bore of said body and encircling said dies, said sleeve provided with a non-circular portion extending longitudinally of said bore to prevent said dies from rotating therein, but to permit them to have longitudinal movement therein, means adapted to adjust rotatably and fix said sleeve in the body, a tooth stop also arranged transversely of said body bore lying alongside said dies and spanning the distance between them, said tooth stop constituting an anvil and having tight sliding engagement with the sides of said dies.

12. A saw tooth shaper comprising a longitudinally slotted body provided with a transverse bore, a pair of dies slidably mounted in said bore and held against rotation therein, said dies being arranged at opposite sides of said body slot, a lead screw provided with a pair of opposite hand threads engaging said dies and adapted to move the latter towards and from each other relatively, a bifurcated lever engaging said ends of said lead screw and bearing against the sides of said body, means for limiting the stroke of said handle, saw guiding elements arranged in said slotted body, a bored sleeve arranged in the bore of said body and encircling said dies, said sleeve provided with a non-circular portion extending longitudinally of said bore to prevent said dies from rotating therein, but to permit them to have longitudinal movement therein, means adapted to adjust rotatably and fix said sleeve in the body, a tooth stop also arranged transversely of said body bore lying alongside said dies and spanning the distance between them, said tooth stop constituting an anvil and having tight sliding engagement with the sides of said dies.

13. In a saw tooth shaper, a slotted head; a pair of compression dies, means for moving said dies towards and from each other transversely of said head, and an elongated tooth stop extending transversely of said slotted head comprising an anvil arranged longitudinally alongside said dies and extending generally parallel to the path of movement of the latter and spanning the distance between them, said tooth stop being partially slotted in the plane of the opposed faces of said dies, said tooth stop having tight sliding engagement with said dies adjacent the end of the movement of the latter toward each other, said tooth stop being relatively unyielding and having one shaped die face conforming to the face of a shaped swaged tooth.

14. In a saw tooth shaper, a slotted head, a pair of compression dies, means for moving said dies towards and from each other transversely of said head, and an elongated tooth stop extending transversely of said slotted head comprising an anvil arranged longitudinally alongside said dies and extending generally parallel to the path of movement of the latter and spanning the distance between them, said tooth stop having tight sliding engagement with said dies adjacent the end of the movement of the latter toward each other, said tooth stop being relatively unyielding and having one shaped die face conforming to the face of a shaped swaged tooth, the opposed die faces arranged adjacent the tooth stop being relieved to define the desired contour of the sides of a swaged saw tooth to be shaped and being inclined towards the shaped die face of said tooth stop.

15. In a saw tooth shaper, a slotted head, a pair of compression dies, means for moving said dies towards and from each other transversely of said head, and an elongated tooth stop extending transversely of said slotted head comprising an anvil arranged longitudinally alongside said dies and extending generally parallel to the path of movement of the latter and spanning the distance between them, said tooth stop having tight sliding engagement with said dies adjacent the end of the movement of the latter toward each other, said tooth stop being relatively unyielding and having one shaped die face conforming to the face of a swaged tooth, the opposed die faces arranged adjacent the tooth stop being relieved to approximate the desired contour of the sides of a swaged saw tooth to be shaped and being inclined towards the shaped die face of said tooth stop.

16. In a saw tooth shaper, a slotted head, a pair of compression dies, means for moving said dies towards and from each other transversely of said head, and an elongated tooth stop extending transversely of said slotted head comprising an anvil arranged longitudinally alongside said dies and extending generally parallel to the path of movement of the latter and spanning the distance between them, said tooth stop having tight sliding engagement with said dies adjacent the end of the movement of the latter toward each other, said tooth stop being relatively unyielding and having one shaped die face conforming to the face of a shaped swaged tooth, the opposed faces of said dies lying generally in planes diverging from each other and being inclined towards the shaped die face of said tooth stop.

17. In a saw tooth shaper, a slotted head, a pair of compression dies, means for moving said dies towards and from each other transversely of said head, an elongated tooth stop extending transversely of said slotted head comprising an anvil arranged longitudinally alongside said dies and extending generally parallel to the path of movement of the latter and spanning the distance between them, said tooth stop having tight sliding engagement with said dies adjacent the end of the movement of the latter toward each other, said tooth stop being relatively unyielding and having one shaped die face conforming to the face of a shaped swaged tooth.

ARTHUR M. FERRARI.